(12) United States Patent
Pegoraro

(10) Patent No.: US 12,335,247 B2
(45) Date of Patent: *Jun. 17, 2025

(54) METHOD AND CORRESPONDING TELECOMMUNICATION NETWORK FOR SECURE DATA TRANSMISSIONS BASED ON GRAPH DATABASE

(71) Applicant: BITCORP S.R.L., Milan (IT)

(72) Inventor: Gabriele Edmondo Pegoraro, Milan (IT)

(73) Assignee: BITCORP S.R.L., Milan (IT)

( * ) Notice: Subject to any disclaimer, the term of this patent is extended or adjusted under 35 U.S.C. 154(b) by 238 days.

This patent is subject to a terminal disclaimer.

(21) Appl. No.: 18/001,937

(22) PCT Filed: Jun. 15, 2021

(86) PCT No.: PCT/IB2021/055255
§ 371 (c)(1),
(2) Date: Dec. 15, 2022

(87) PCT Pub. No.: WO2021/255633
PCT Pub. Date: Dec. 23, 2021

(65) Prior Publication Data
US 2023/0231836 A1    Jul. 20, 2023

(30) Foreign Application Priority Data

Jun. 17, 2020 (IT) .......................... 102020000014518

(51) Int. Cl.
*H04L 9/40* (2022.01)
*H04L 45/12* (2022.01)

(52) U.S. Cl.
CPC ........ *H04L 63/0485* (2013.01); *H04L 45/126* (2013.01)

(58) Field of Classification Search
CPC ..... H04L 9/3239; H04L 9/50; H04L 63/0485; H04L 63/00; H04L 45/126; H04L 67/104; H04W 40/02; H04W 40/20
(Continued)

(56) References Cited

U.S. PATENT DOCUMENTS 11,190,341 B2 * 11/2021 Williams .............. H04L 63/061
11,196,552 B2 * 12/2021 Parker ................... H04L 9/3226
(Continued)

FOREIGN PATENT DOCUMENTS

CN         110475232 A      11/2019
WO      2019/229612 A1     12/2019

OTHER PUBLICATIONS

International Search Report and Written Opinion issued on Oct. 13, 2021, in corresponding International Application No. PCT/IB2021/055255, 10 pages.
(Continued)

*Primary Examiner* — Amare F Tabor
(74) *Attorney, Agent, or Firm* — Maier & Maier, PLLC

(57) ABSTRACT

A method of communication between nodes in a telecommunications network. Each node maintains a copy of a shared digital ledger, is identified by a respective identification code and implements a software application configured to manage the transmission of data packets and maintain the shared digital ledger. The method includes: memorizing a list of identification codes, each code identifying a respective node included in a subset of nodes of the network, identifying a receiver node to transmit the data packet, generating a data packet to be delivered to a recipient node, transmitting to the first node of the minimum sequence of nodes the data packet, issuing a request to the network nodes to record the data packet transmission in the distributed ledger, and when a data packet is received, the method
(Continued)

requires that each receiver node, other than the recipient node of the data packet, repeats at least some steps.

11 Claims, 8 Drawing Sheets

(58) Field of Classification Search
 USPC .......................................................... 713/160
 See application file for complete search history.

(56) References Cited

U.S. PATENT DOCUMENTS

| | | | | |
|---|---|---|---|---|
| 11,196,570 | B2* | 12/2021 | Borne-Pons | H04L 9/30 |
| 11,239,999 | B1* | 2/2022 | Winarski | H04L 9/12 |
| 11,632,390 | B2* | 4/2023 | Bartolucci | G06F 16/27 |
| | | | | 726/22 |
| 11,637,691 | B2* | 4/2023 | Venkaramappa | G06F 16/27 |
| | | | | 713/171 |
| 11,888,965 | B2* | 1/2024 | Fang | G06F 21/602 |
| 2010/0303077 | A1* | 12/2010 | Bruno | H04L 45/16 |
| | | | | 370/392 |
| 2015/0058933 | A1 | 2/2015 | Larson et al. | |
| 2017/0236120 | A1* | 8/2017 | Herlihy | G06Q 20/065 |
| | | | | 705/67 |
| 2017/0324738 | A1 | 11/2017 | Hari et al. | |
| 2018/0020046 | A1* | 1/2018 | Foebel | H04W 40/22 |
| 2018/0048738 | A1 | 2/2018 | Hinds | |
| 2019/0334697 | A1 | 10/2019 | Winslow et al. | |

OTHER PUBLICATIONS

Duncan J. Watts et al., "Collective dynamics of 'small-world' networks" Nature, vol. 393, Jun. 4, 1998, pp. 440-442, 3 pgs.

Jeffrey Travers et al., "An Experimental Study of the Small World Problem", Sociometry, vol. 32, No. 4 (Dec. 1969), pp. 425-443, 20 pgs.

* cited by examiner

DBG1

DBG3

METHOD AND CORRESPONDING TELECOMMUNICATION NETWORK FOR SECURE DATA TRANSMISSIONS BASED ON GRAPH DATABASE

TECHNICAL FIELD

The present invention to the field of telecommunications. In greater detail, the embodiments of the present invention present a method and a relevant telecommunications network configured for secure data transmissions.

BACKGROUND

In the telecommunications sector, there has always been a need to guarantee the confidentiality of information exchanged between two or more users of the telecommunications network, as well as the need to certify the origin of information received in order to ensure that no interference has occurred in the exchange of information and/or that the information exchanged has not been altered by a third party.

A variety of solutions have been proposed to address these needs. For instance, the TOR network as well as virtual private network (VPN) systems allow data packets to be exchanged while maintaining the privacy of the entities accessing these networks and of the data exchanged.

US 2015/0058933 proposes a technique for establishing a secure communication channel between a first computer and a second computer via a computer network. The technique comprises initially enabling a secure communication mode at the first computer without the user having to enter any encryption information to establish the secure communication channel. Next, the secure communication channel between the first computer and the second computer is established via the computer network. In particular, the secure communication channel is a channel of a virtual private network established through the computer network in which one or more data values varying according to a semi-random sequence are inserted in each of the data packets.

However, by construction such networks significantly reduce the data transfer rate (e.g. evaluated in terms of bitrate) across the network. In addition, accessing and transferring files (e.g. multimedia files) from a remote archive (e.g. a repository) may temporarily expose information about the entity making such access or transfer, thereby reducing the security conferred by such networks.

In the last decade, the development of blockchain technology-based on a digital ledger shared between several entities in a computer network—has led to the possibility of certifying in an unalterable way a digital transaction between several entities in the computer network.

For example, US 2018/0048738 proposes that devices in a wireless telecommunications network implement a blockchain distributed among the devices. In detail, a base station of the network receives, from a mobile device, a radio communication containing information associated with a blockchain transaction. The base station converts this information on the transition of a blockchain into a format based on an internet protocol. Subsequently, the base station updates the blockchain by propagating the Internet protocol-formatted information to the other base stations of the wireless telecommunications network via an Internet protocol-based network internal to the wireless telecommunications network.

The solution proposed by US 2018/0048738 consists substantially in exploiting the computational resources of the base stations of the wireless telecommunications network for dynamically managing and updating copies of shared digital ledgers of the blockchain of the mobile devices connected to the base stations of the wireless telecommunications network.

In addition, several solutions based on blockchain technology have been proposed in the art aimed at certifying the identity of network entities involved in a transaction or to certify the transaction itself, to certify the correctness of the data exchanged and/or of a computer network entity.

For example, US 2017/0324738 proposes an Internet security system configured to provide security resources based on an 'Internet Blockchain'. In detail, the Internet Blockchain can be used to allow internet 'actors' such as internet ledgers, DNS entities, autonomous systems (ASes) and the like, to verify the ownership of internet resources such as IP addresses, AS numbers, IP prefixes, DNS domain names and the like by a specific internet actor. In addition, the Internet Blockchain makes it possible to verify transitions relating to Internet resources such as the allocation of IP addresses, AS numbers, IP prefixes, DNS domain names and the like requested by Internet actors.

This system generally operates at the upper levels of the ISO/OSI model—generally from the transport level or higher—and thus relies on the TCP/IP structure for transferring data packets to the lower levels.

In contrast, WO 2019/229612 of the same Applicant proposes methods and systems for transferring data in an encrypted and certified manner by means of a protocol comprising a distributed digital ledger that generates sender and recipient addresses to establish a communication in which both the content and the channel are encrypted.

Although the methods and systems proposed in WO 2019/229612 make it possible to achieve a secure and reliable communication, the implementation thereof is complex and requires devices with high hardware resources.

Again, US 2019/334697 describes a method for monitoring the communication and the computer security in a distributed communication network. The distributed communication network comprises communication nodes. Each node is configured to communicate with another node and to store a local copy of a blockchain ledger. The method requires each communication node to be configured to generate a record to be added to the local copy of the blockchain ledger each time the communication node communicates with any other communication node in the distributed communication network. In addition, each communication node verifies and monitors the blockchain by means of the consensus between the communication nodes and by comparing the hashes of the previous blocks in the blockchain.

Finally, CN 110475232 describes a method of transmission in a blockchain network, the method comprises creating a communication channel based on Bluetooth, NFC and AirDrop. When a node receives a request to send data to a recipient that cannot be reached directly, an optimal transmission path is calculated on the basis of the network topology diagram.

The Applicant has therefore noted the absence in the industry of systems and methods capable of routing traffic in a fully decentralised manner while maintaining low latency times, such as to allow effective audio/video communication by users of a telecommunications network.

SUMMARY

An object of the present invention is to overcome the drawbacks of the prior art.

In particular, it is an object of the present invention to provide a method of communication between nodes of a telecommunications network that enables data packets to be transferred securely over an encrypted communication channel with low computational cost and latency.

A further object of the present invention is to propose a method of communication between nodes of the telecommunications network which enables a secure communication channel to be established dynamically and adaptively, in particular in a decentralised manner, i.e. without the need to implement a routing node or other similar entity in the telecommunications network.

These and other objects of the present invention are achieved by a system incorporating the features of the accompanying claims, which form an integral part of the present description.

In particular, according to a first aspect, the present invention is directed to a method of communication between nodes of a telecommunications network. In particular, each node maintains a copy of a shared digital ledger, is identified by a respective identification code and is implemented by a software application configured to manage the transmission of data packets and maintain the shared digital ledger.

The method comprises that each sending node of a data packet executes the steps of:
a. memorizing a list of identification codes of a subset of nodes of the network, each identification code identifying a respective node of a subset of nodes of the network,
b. identifying a receiver node to which to transmit said data packet,
c. generating a data packet to be delivered to a recipient node,
d. transmitting to the receiver node the data packet,
e. issuing a request to the network nodes to record said data packet transmission in the distributed ledger, and
when a data packet is received, the method requires that each receiver node, other than the recipient node of the data packet, repeat at least the steps b., and d.

Advantageously, the step a. of identifying a receiver node to which said data packet is transmitted comprises:
generating a graph database in which a respective arc connects the sender node or the receiver node, different from the recipient node, to each node of the network of which the identification code is comprised in the list of identification codes of the sender node or the receiver node, other than the recipient node, and
selecting the receiver node among the nodes of said graph database.

Furthermore, if it is not possible to identify a receiver node, the method further comprises the steps of:
analyzing a contact list stored in the sending node, each contact in the contact list being associated with a corresponding device;
if at least one contact is identified in which is associated with a device having installed said software application but not enabled to exchange packets in the telecommunication network, enabling said device to exchange packets as a temporary node of the telecommunication network, and
selecting said device as receiver node of the data packet.

With this solution, a packet can be transmitted quickly and reliably via the network. In particular, the selection of the receiver node by means of the graph database makes it possible to route packets extremely quickly without requiring knowledge of the network on the part of the nodes and without requiring the presence of a central or reference element. Furthermore, the Applicant has determined that the packet is reliably transmitted to the recipient node in accordance with the "small-world" theory, described for example in Watts, D., Strogatz, S. "*Collective dynamics of 'small-world' networks*" Nature 393, pages 440-442 (1998) e Travers, Jeffrey, and Stanley Milgram, "*An Experimental Study of the Small World Problem*", Sociometry 32, pages 425-443 (1969). Furthermore, by enabling temporary nodes, the number of network nodes can be temporarily increased so as to ensure efficient transmissions between network nodes even when the sender node is in a geographical region comprising only a few network nodes or the traffic in this geographical region is particularly heavy, thereby increasing the security and robustness of the telecommunications network.

Preferably, the step of enabling said device as a temporary node in the communication network comprises assigning a temporary identification code to said contact. In other words, a device can be enabled to operate as a network node simply by assigning it a respective temporary identification code.

Even more preferably, the method comprises disabling the device to operate as a temporary node in the telecommunications network once the transmission of at least one data packet has been completed and/or a predetermined total time has been transmitted or since the last transmission of a data packet.

In one embodiment, the step a. of identifying a receiver node to which to transmit said data packet further comprises:
acquiring a position information of the network nodes comprised in the graph database.

Furthermore, selecting the receiver node among the nodes of said graph database comprises selecting the node of the graph database at a minimum distance from the sending node or from the receiver node, different from the recipient node.

This makes it possible to select the receiver node very simply and computationally quickly even for node with limited hardware resources. At the same time, the selection of the receiver node based on distance from the sender node enables very low latency times to be achieved, substantially lower than the envisaged maximum transmission time for a data packet in the case of voice/video communications. Furthermore, in the case of radio transmissions, or more generally of the wireless type, the selection of the receiver node at a minimum distance makes it possible to limit the power consumption necessary for the transmission of the packets, which is particularly useful in the case of network nodes corresponding to mobile devices-battery powered.

Preferably, acquiring a position information of the network nodes comprised in the graph database comprises, for each network node comprised in the graph database, acquiring at least one among:
a geographical position measured through a global navigation satellite system (GNSS) with which the node is equipped,
information relating to a cellular network cell to which the node is connected,
an IP address associated with the node,
an Access Point Name to which the network node is connected,
geolocation data associated with the node by a geomessaging, geomarketing, etc. service.

In one embodiment, a receiver node cannot be identified if a node of the communication network is not identified within a maximum distance from the sender node. Preferably, said maximum distance is determined as a function of a maximum communication range of the sender node.

In one embodiment, selecting the receiver node among the nodes of said graph database comprises:
identifying at least one sequence of nodes and arcs of the graph database that allows to connect the sending node or the receiving node, different from the recipient node, to the recipient node, and
selecting as the receiver node the first node of said at least one sequence next to the sender node or in the receiver node, different from the recipient node.

For example, when the recipient node is not directly reachable by the sender node, the method comprises that the sender node transmits a message to request the connection with the recipient node to receiver nodes, other than the recipient node, comprised in the identification code list of a subset of nodes of the network, each receiver node comprised in the subset of nodes of the network forwarding the connection request to the nodes whose identification codes are comprised in the respective list or transmitting to the sender node or to the receiver node a reply message if the recipient node is comprised in the respective list.

Thanks to this solution, the best receiver node can be selected based on the actual sequence of nodes of the network to be traversed at the cost of more network information exchanged to define the graph database.

In one embodiment, identifying at least one sequence of nodes and arcs of the graph database comprises identifying a sequence that defines a minimum path between the sender and the recipient node.

In this way, the overall packet transmission time can be substantially reduced.

In this way, information on the current position of the nodes of the network can be obtained easily and immediately with sufficient accuracy to select the receiver node.

In one embodiment, the method further comprises the steps of:
acquiring an information of availability to receive and retransmit the data packet from the selected receiver node;
if the selected receiver node is not available to receive and retransmit the data packet, discarding the selected receiver node, and
selecting a new receiver node having a distance from the sending node or from the receiver node, different from the recipient node, lower than the distance of the other nodes of the graph database from the sending node or from the receiver node.

By implementing the availability check procedure as indicated, it is possible to prevent the data packet from being transmitted to a receiver node that is currently unable to handle the transmission/reception thereof—for example, when the network node is engaged in a transmission according to a traditional protocol that entirely occupies the resources of a transceiver module of the network node, or when the network node has reached a limit of data packets that can be handled in transmission/reception.

In one embodiment, the method further comprises the steps of:
checking whether the recipient node is comprised in the graph database;
in the affirmative case, checking whether the recipient node is within a useful communication distance from the sending node or from the receiver node, other than the recipient node, and
in the affirmative case, selecting the recipient node as the receiver node even if there is a different node of the graph database at a minimum distance from the sending node or from the receiver node, other than the recipient node.

In this way, both the total transmission time of the data packet and the total traffic on the network can be reduced.

In one embodiment, the method further comprises the steps of:
analyzing a contacts list stored in each node, said contact list comprising, for each contact, at least one identifier element between:
a telephone number;
an IMSI code;
an IMEI code, and
a MAC code;
identifying an identifier element associated with an identification code of a network node, and
supplying said identification code to the node comprising the corresponding identifier element.

Thanks to this solution, it is possible to supply a number of network node identification codes as soon as a node enters the network, thus ensuring that an effective communication channel can be established.

In one embodiment, each network node implements a software application configured to manage the transmission of data packets and to maintain the shared digital ledger.

A different aspect of the present invention concerns a telecommunications network comprising a plurality of nodes. Each node comprises at least one data processing module, a memory module and a transceiver module.

Advantageously, each node is configured for:
maintaining a copy of a distributed ledger, and
executing the method according to any of the above embodiments.

In particular, each node of the telecommunications network comprises a smartphone, a tablet, a computer, a radio base station, an evolution Node B, a WiFi modem or router or another similar device.

Further features and advantages of the present invention will be more apparent from the description of the accompanying drawings.

BRIEF DESCRIPTION OF THE DRAWINGS

The invention will be described below with reference to some examples, provided for explanatory and non-limiting purposes, and illustrated in the accompanying drawings. These drawings illustrate different aspects and embodiments of the present invention and, where appropriate, reference numerals illustrating similar structures, components, materials and/or elements in different figures are indicated by similar reference numbers.

DETAILED DESCRIPTION OF THE EMBODIMENTS

Figure 1:
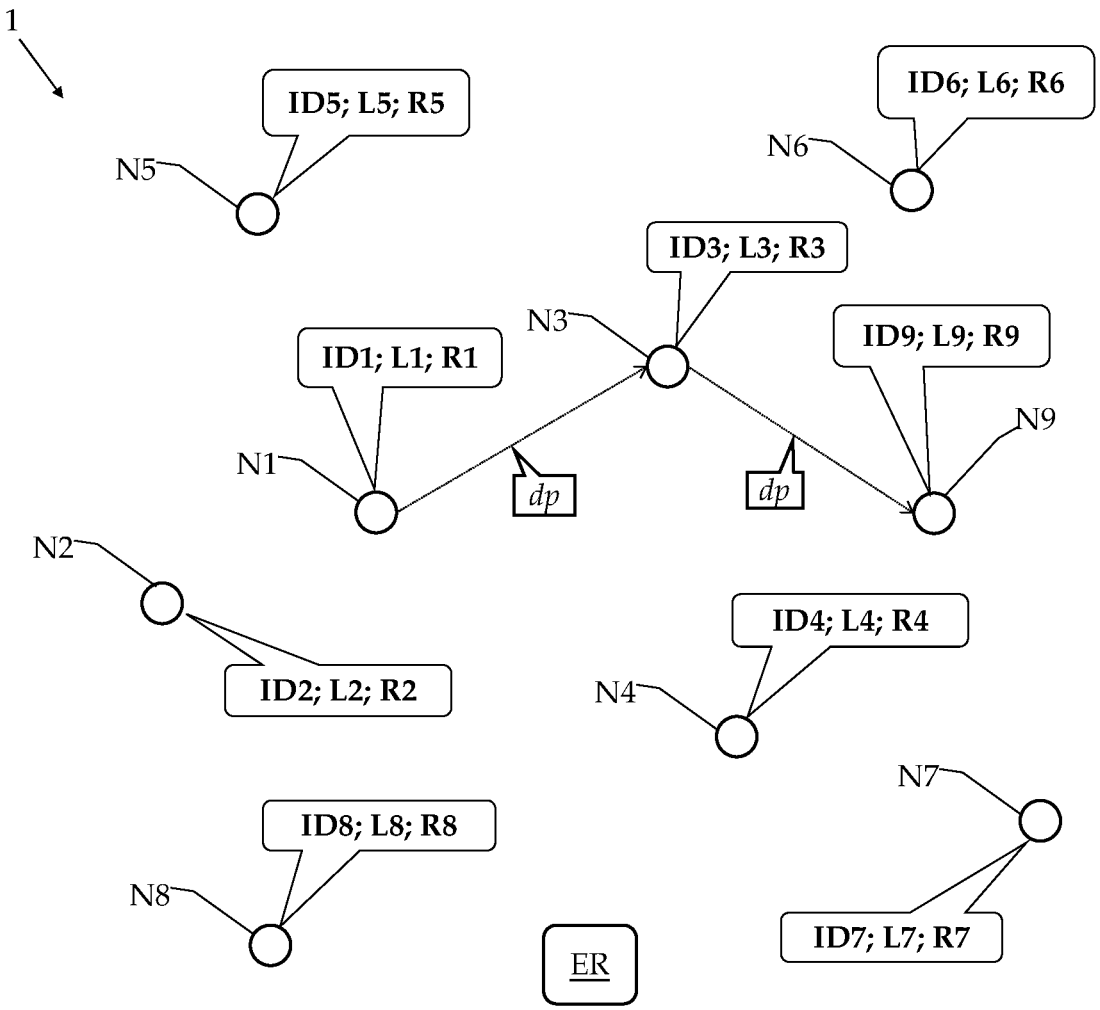
FIG. 1 is a schematic representation of a telecommunications network according to an embodiment of the present invention.

While the invention is susceptible to various modifications and alternative constructions, certain preferred embodiments are shown in the drawings and are described hereinbelow in detail. It is in any case to be noted that there is no intention to limit the invention to the specific embodiment illustrated, rather on the contrary, the invention intends covering all the modifications, alternative and equivalent constructions that fall within the scope of the invention as defined in the claims.

The use of "for example", "etc.", "or" indicates non-exclusive alternatives without limitation, unless otherwise indicated. The use of "includes" means "includes, but not limited to" unless otherwise stated.

With reference to FIG. 1, reference 1 indicates a telecommunications network—abbreviated to 'network' in the following—according to an embodiment of the present invention. The network 1 comprises a plurality of network nodes, nine network nodes N1-N9 in the non-limiting example considered, capable of exchanging information through electromagnetic signals, preferably—albeit not limited—by means of electromagnetic waves.

Figure 2:
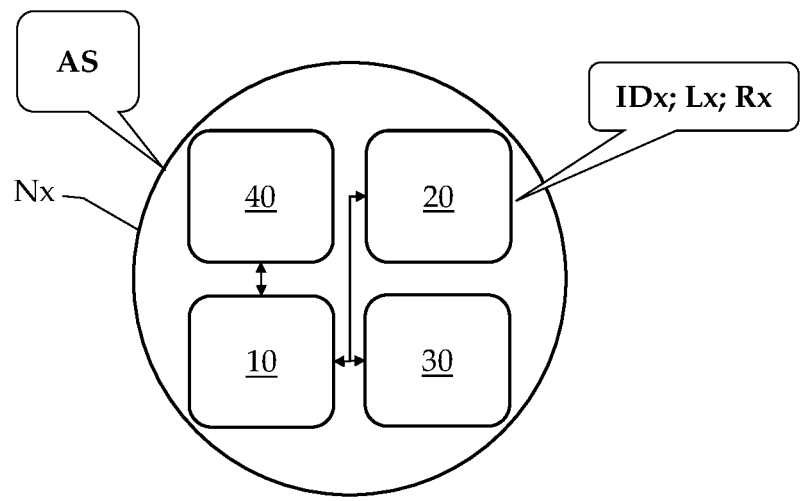
FIG. 2 is a block diagram of a generic node of the telecommunications network in FIG. 1.

As illustrated in greater detail in FIG. 2, the generic node Nx of the network 1 (with x comprised between 1 and 9 in the example considered) comprises a processing module 10 configured for implementing one or more data processing algorithms, a memory module 20 configured for storing data, and a transceiver module 30 configured for establishing and managing one or more connections with at least one node of the network 1.

For example, the processing module 10 comprises one or more processors, microprocessors, microcontrollers, ASICs, FPGAs, DSPs or the like. The memory module 20 comprises one or more non-volatile and volatile memory elements suitable for storing data, preferably in a binary format. The transceiver module 30 comprises at least one modem for communications via electromagnetic radiations (Wi-Fi, Bluetooth, GSM, UMTS, LTE/LTE-A, 5G, etc.) and optionally a modem for wired communications.

Preferably, albeit not limited, the processing module 10 comprises one or more additional modules 40, for example, the node Nx may comprise an interface module configured for supplying data and/or receiving instructions from an external entity such as a user or other device, and additionally or alternatively a sensing module comprising one or more sensors, selected among motion sensors—such as one or more among accelerometers, gyroscopes, gravity sensors, etc.—, position sensors—such as one or more among magnetometers, a GNSS sensing system, etc.—and environmental sensors—such as one or more among barometers, photometers, thermometers, microphones, cameras, proximity sensors, etc., and biometric sensors—such as a fingerprint reader.

Obviously, the generic node Nx of the network 1 comprises a power circuitry (not illustrated) configured for powering modules 10-40 of the node Nx and, if applicable, ancillary circuitry required for the proper operation of the modules 10-40.

The generic node Nx of the network 1 comprises, but is not limited to: a smartphone, a tablet, a personal computer, a radio base station, an eNodeB, a wireless modem and the like.

In the embodiment considered, the generic node Nx of the network 1 memorizes an identification code IDx that allows the node Nx to be uniquely identified in the network. Preferably, the identification code IDx is a hash value representing a public address associated with a private encryption key corresponding to a second hash value—similar to the public address and to the private key of a cryptocurrency wallet.

In a preferred embodiment, the identification code attributed to the node Nx by a registration entity IDx and the corresponding private encryption key are generated and assigned to the node Nx by a registration entity ER when a network insertion request 1 is executed by the node Nx. Optionally, the registration entity ER is also configured for operating as a network node 1. For example, the registration entity ER is implemented by a remote server accessible via a connection based on secure TCP/IP protocol.

In addition, the generic node Nx stores a list Rx of one or more identification codes associated with respective nodes of the network 1 with which it exchanged data in the past and/or habitually exchanges data.

Finally, the generic node Nx of the network 1 maintains-stores and updates-a copy of a shared digital ledger Lx, which will be referred to as 'ledger' in the following for brevity's sake.

Advantageously, the generic node Nx runs a software application AS configured for managing the exchange of information across a peer-to-peer (P2P) network in order to enable the exchange of information between nodes of the network 1 by transmitting data packets and maintaining the ledger Lx according to the procedures described below.

Figure 3:
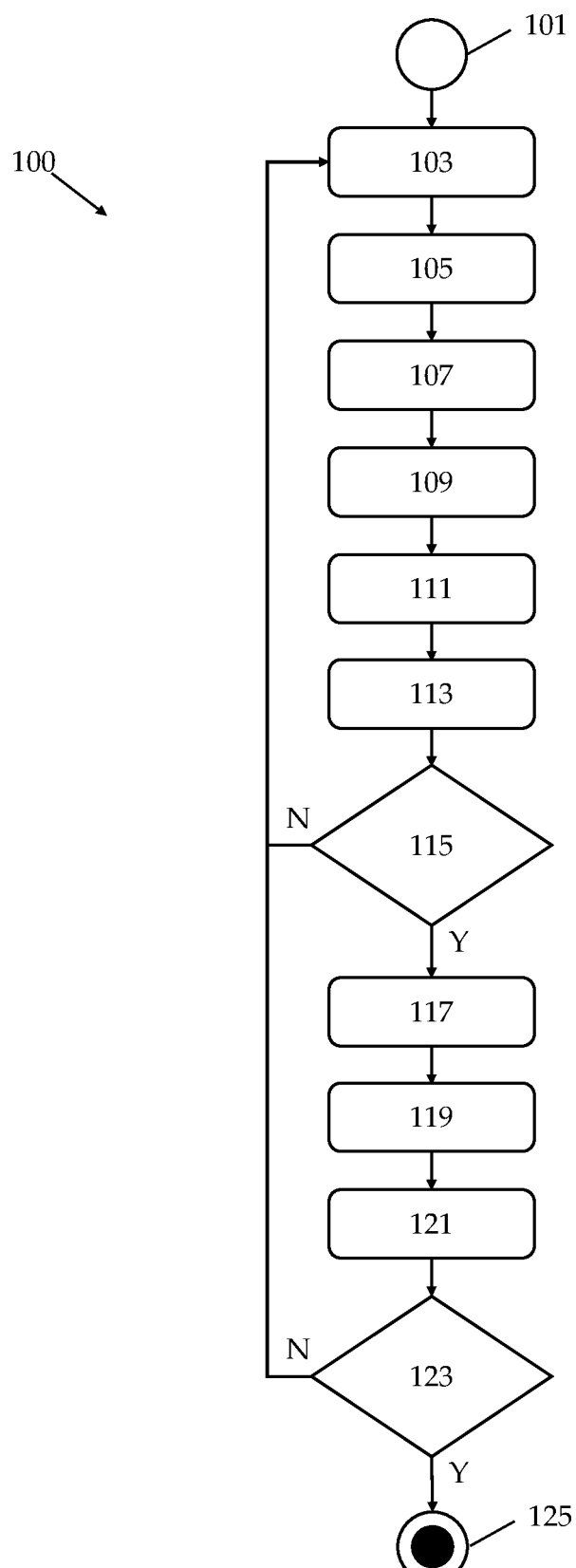
FIG. 3 a flow chart of a communication procedure between nodes of the telecommunications network of FIG. 1 according to an embodiment of the present invention

The nodes N1-N9 of the network 1 are configured for exchanging data with each other, preferably grouped in data packets dp, by executing a transceiving procedure 100 in accordance with an embodiment of the present invention and illustrated schematically by the flowchart of FIG. 3. Typically, one piece of information to be communicated is represented by a plurality of binary data which are subdivided into sequential pieces of information, each of which is transmitted in a corresponding data packet. Information can then be reconstructed by extracting the portions of information from the received data packets and by ordering them in the correct order.

By way of example, below reference will be made to the transmission of a data packet dp by node N1 to node N9, using node N3 as an intermediary receiver (schematically illustrated of FIG. 1 by means of dotted arrows).

The procedure 100 begins when an application running on a first node of the network 1—node N1 in the example under consideration—requests a transfer of information to a second node of the network 1—node N9 in the example under consideration (start block 101).

The procedure 100 comprises selecting a node N1-N9 of the network 1 to which to transfer the data packet dp (block 103) among the nodes comprised whose identification code ID1-ID9 is comprised in the list R1 of the sender node N1.

Preferably, the selection allows obtaining a sequence of nodes of the network that allows delivering a data packet to the recipient node N9 through a corresponding sequence of transmissions of the data packet dp from one node to another node that ensures low latency and low energy consumption. Even more preferably, the procedure 100 allows using the minimum sequence of nodes of the network that allows delivering the data packet dp to the recipient node N9 through a minimum number of transmissions of the data packet dp from one node to another node.

Figure 4A:
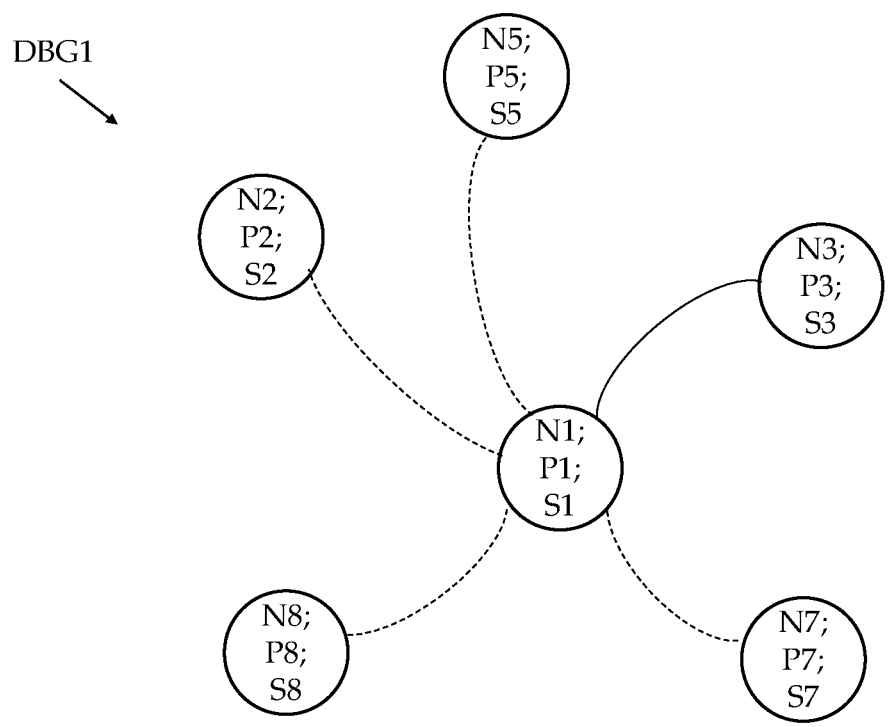
FIG. 4a is a schematic representation of a graph database of a first node of the telecommunications network according to an embodiment of the present invention.
Figure 4B:
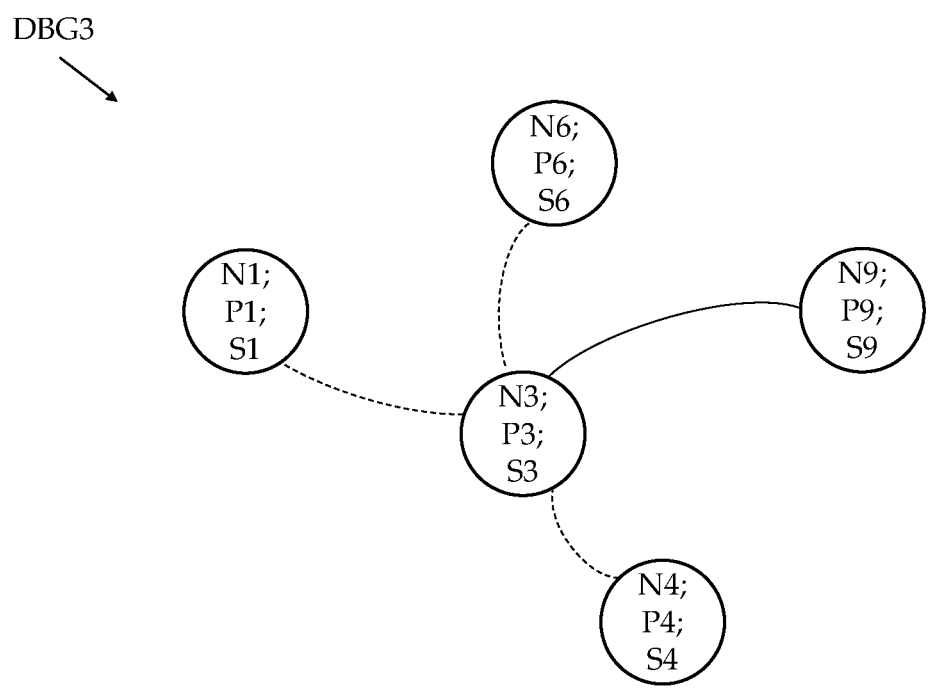
FIG. 4b is a schematic representation of a graph database of a second node of the telecommunications network according to an embodiment of the present invention.

In the preferred embodiment, the node to which the above mentioned data packet dp is to be transferred is identified by means of a graph database DBG1-DGB9 referred to the corresponding node N1-N9, of which the graph databases DBG1 and DBG3 relating to the nodes N1 and N3 are schematically illustrated in FIGS. 4a and 4b.

Figure 5:
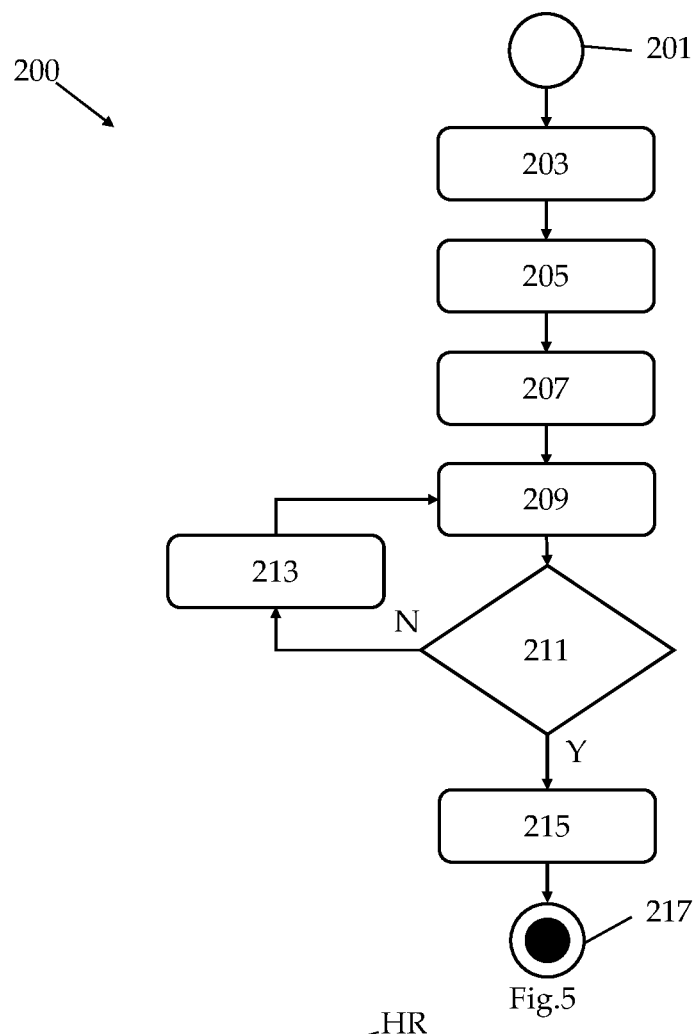
FIG. 5 is a flowchart of a procedure for determining, via the graph database of FIGS. 4a and 4b, a receiver node to which to transmit a data packet according to an embodiment of the present invention.

In the embodiment considered, the node N1-N9 to which to transmit the packet dp is selected by implementing a node selection procedure 200 (illustrated in FIG. 5). In detail, the procedure 200, once started (start block 201) comprises populating the graph database DBG1 referred to the sender node N1—or, in subsequent iterations, a graph database DBG2-DBG8 of an intermediary receiver node N2-N8—which must transmit the data packet dp. The generic graph database DBGx is populated in such a way that each node of the graph database DBGx comprises a node N1-N9 whose identification code ID1-ID9 code is stored in the list Rx of the generic node Nx considered and that each arc connects the generic node Nx to a respective node N1-N9 whose identification code ID1-ID9 is stored in the list Rx of the generic node Nx (block 203). In the example of FIG. 4a, the graph database DBG1 of the sender node N1 comprises the nodes N2, N3, N5, N7 and N8 whose identification codes ID2, ID3, ID5, ID7 and ID8 are contained stored in the list R1 of the sender node N1, while in FIG. 4b the graph database DBG3 of the receiver node N3 comprises the nodes N1, N4, N6 and N9 whose identification codes ID1, ID4, ID6 and ID9 are stored in the list R3 of the receiver node N3.

Advantageously, the procedure 200 comprises detecting an indication of the current position P1-P9 of the corresponding node N2-N9 of network 1 associated with a graph database DBG1 of the node N1 (block 205). Preferably, the position indication P1-P9 is added to the corresponding node of the graph database DBG1.

For example, the position indication comprises one or more among: a geographic position measured by a global navigation satellite system (GNSS), information relating to a cellular network cell to which the node N1-N9 is connected (in the case of a mobile device), an IP address associated with the node N1-N9, an Access Point Name (APN) to which the network node is connected, geolocation data (geolocation or geotag) associated with the node N1-N9 by geomessaging, geomarketing services etc. used. For this purpose, the instances of the software application AS running on the generic node Nx is configured for acquiring the position indication P1-P9 referred to the respective node Nx and making it available to another node N1-N9 of the network 1 that requests it. Alternatively, the software application AS running on the generic node Nx is configured for detecting and transmitting, preferably periodically, the current position indication P1-P9 to each node N1-N9 whose identification code ID1-ID9 is stored in the list Rx of the generic node Nx considered.

Optionally, the procedure 200 comprises detecting a current capability S1-S9 to establish a communication channel to receive and/or forward the data packet dp from each node N1-N9 of the network 1 associated with a corresponding node of the graph database DBG1 (block 207). Preferably, this capacity indication S1-S9 is added to the corresponding node of the graph database DBG1.

Subsequently, the procedure 200 comprises selecting a receiver node among the database nodes DBG1 to which to transfer the data packet dp (block 209). In the preferred embodiment, the node with the shortest distance from the central node—i.e. the sender node N1—of the graph database DBG1 is selected as the receiver node. In the example of FIG. 4a, the node with the shortest distance corresponds to network node N3. In general, the minimum distance node is identified by comparing the position indications P2-P9 associated with the nodes of the graph database DBG1 with the position indication P1 associated with the central node of the graph database DBG1, i.e. the sender node N1, and identifying the node at a shorter distance than the others. "Distance" herein means a measure (e.g. a linear measure) or a set of measures (e.g. a set of measures/vectors in a Cartesian or polar coordinate system) that allows a spatial separation between two network nodes to be determined. More generally, "distance" refers to a separation between two nodes that requires a non-zero time to transmit a data packet from one node to the other. In this case, the node with the shortest distance is the node with the shortest time delay to be reached by a data packet. However, the minimum distance ensures that the transmission of the data packet from one node to another occurs within a timeout interval, i.e., without requiring retransmissions of the data packet.

Once the minimum path has been determined, the procedure 200 comprises checking that a communication channel can actually be established with the selected node (decision block 211). In detail, the procedure 200 comprises checking the capacity S3 to establish a communication channel of the node N3 at a shorter distance.

In the negative case (output branch N of block 211), the node with the shortest distance is discarded (block 213) and the procedure 200 comprises selecting a new minimum path by repeating the steps described above from block 209.

Otherwise, the node N3 at a shorter distance is considered usable (output branch Y of block 211) and the procedure 200 provides, first, for outputting the identification code associated with the node N3 of the network 1 (block 215) for the continuation of the procedure 100 and then to terminate (at the end block 217).

Figure 6:
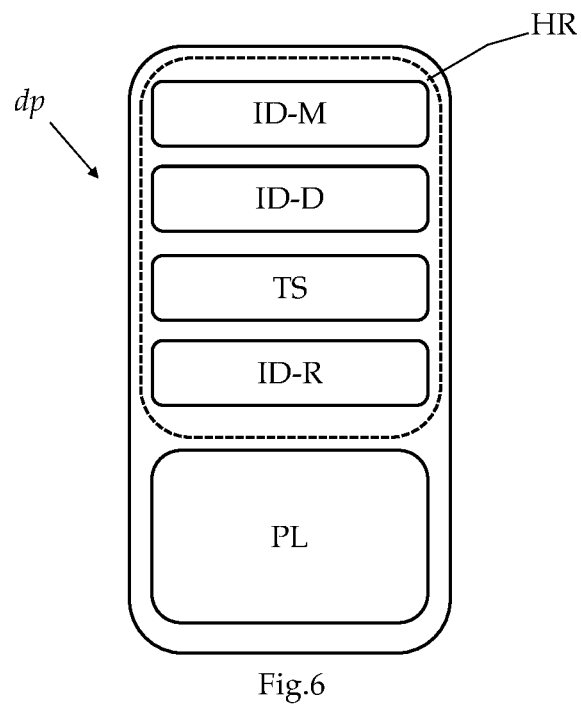
FIG. 6 is a schematic representation of a generic data packet exchanged among nodes of the network according to an embodiment of the present invention.

Once the node N3 to be transmitted has been determined, the procedure 100 comprises generating the data packet dp (illustrated schematically in FIG. 6) comprising at least a portion of the information to be transmitted to the recipient node N9 (block 105). In the example considered in FIG. 5, the data packet dp comprises a header, or header HR, and a payload, or payload PL. The header HR comprises a sender field ID-M in which there is reported the identification code ID1 of the sender node N1 of the data packet dp, a recipient field ID-D in which it is reported the identification code ID9 of the recipient node N9 of the data packet dp, a receiver field ID-R in which it is reported the identification code of the node to which the packet is actually to be transmitted and, optionally, a timestamp TS indicating an instant of time of the generation of the data packet dp as measured by the node N1 in question—for example, through an internal clock of the relative processing module 10. Preferably, the timestamp TS is a certified timestamp, to be acquired/provided by the Registration Entity ER or a Time Stamping Authority (or TSA) rather than a timestamp generated locally by the sender node N1. In one embodiment, the certified timestamp is obtained at the request of the sender node N1 in conjunction with the generation of the data packet dp.

In particular, the procedure 100 comprises inserting in the receiver field ID-R the identification code of the node N3 selected by means of the procedure 200 described above. The payload PL of the data packet dp, on the other hand, comprises the information or, more typically, a portion of the information to be transmitted. Preferably, at least the payload PL of the data packet dp is encrypted with the identification code of the recipient node N9 so that its content is decryptable to the recipient node N9 only.

By generating the data packet dp, it is transmitted from the sender node N1 to the node, N3 in the example considered, whose identification code ID3 is comprised in the receiver node field ID-R (block 107). In general, the data packet is encoded in an electromagnetic radiation radiated by the transceiver module 30 of the sender node N1.

In addition, the procedure 100 comprises that a request to record the transmission of the data packet dp in a data block Bn of the ledger copies L1-L9 maintained by the nodes N1-N9 of the network 1 is carried out (block 109). In detail, the nodes N1-N9 of the network 1 share the data contained in the ledger copies L1-L9 by establishing a peer-to-peer (P2P) structure substantially in accordance with Distributed Ledger Technology (DLT), as follows.

Figure 7:
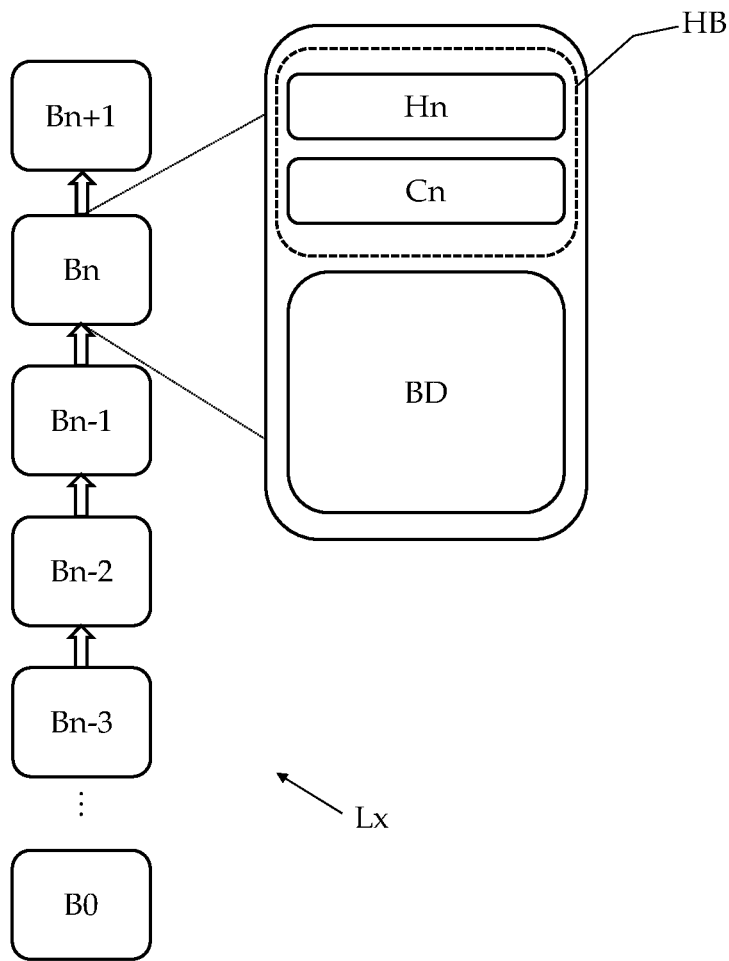
FIG. 7 is a schematic representation of a generic digital ledger shared among the nodes of the telecommunications network in FIG. 1.

Upon receipt of such a registration request, the nodes N1-N9 of the network 1 record the transmission of the data packet dp within the data block Bn being generated at the time of receipt of the registration request by the node N1 (block 111). In particular, the generic copy of the ledger Lx comprises a plurality of data blocks Bn, Bn−1, Bn−2, Bn−3, etc. from a source data block B0, which are concatenated together in chronological order to form an unalterable data structure, as illustrated schematically in FIG. 7. In particular, 'unalterable' herein means that once a data block Bn has been added to the ledger Lx, it is not possible to make changes to the data contained in the data block Bn and/or any of the preceding blocks of the ledger Lx without invalidating the entire data structure. In detail, each block is marked by a header or header HB that contains a unique hash value Hn associated with the Bn data block, a hash value Hn−1 associated with the previous data block Bn−1 in the chain of blocks forming the distributed ledger Lx, and a count value Cn that increases as the position of the data block Bn in the block chain of the ledger Lx increases. In addition, the data block Bn comprises a body BD in which one or more transmission records rdp are stored.

Figure 8:
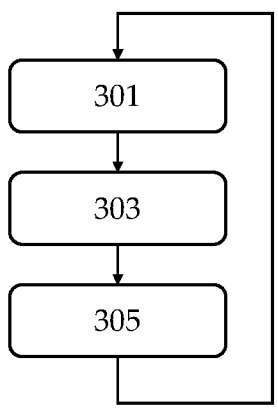
FIG. 8 is a flowchart of a procedure for generating and adding a new data block to the shared digital ledger of FIG. 3 according to an embodiment of the present invention.

In the embodiment considered, the registration of the transactions within the data blocks Bn of the ledger L1-L9 takes place through a recording procedure 300—of which FIG. 8 is a flow chart. The procedure 300 comprises generating a new data block Bn of the ledger Lx by applying a proof-of-history protocol, which makes it possible to certify a temporal order of creation and addition of the data block Bn to the ledger Lx (block 301). In detail, each block is generated when a generic node Nx of the network 1 calculates the hash value Hn of the data block Bn by means of a hashing algorithm $f_H$ (e.g. based on the SHA-2 or SHA-3 family of encryption algorithms) from a hash value Hn−1 associated with the previous data block Bn−1 in the chain of blocks forming the distributed ledger Lx and, possibly, one or more additional values.

In the embodiments of the present invention, the hashing algorithm $f_H$ requires at least a minimum hashing time $t_H$ to be performed on a parallel random-access machine (PRAM) having a predetermined number of processors p. In detail, the hashing function $f_H$ implemented comprises the sequential execution—which cannot be parallelised—of a predetermined number of operations. For example, the hashing algorithm $f_H$ comprises N iterations of an encryption algorithm SHA-2, more preferably SHA-3, each iteration of the algorithm receiving as input at least the hashing value calculated at the previous iteration. Consequently, the hashing time $t_H$ required for the execution of the hashing function $f_H$ from any node N1-N9 of the network 1 is the sum of the times needed to execute each of these operations.

In contrast, the hash Hn can be verified by means of a verification algorithm $v_H$ in a verification time ty which is much shorter than the hashing time $t_H$. Preferably, the verification algorithm $v_H$ can be executed using parallel processing on multiple processors.

The hashing algorithm $f_H$ and the verification algorithm $v_H$ suitable for use in the embodiments can be defined as algorithms for the evaluation and verification, respectively, of a Verifiable Delay Function defined in accordance with Dan Boneh, Joseph Bonneau, Benedikt Bünz, Ben Fisch: "*Verifiable Delay Functions*" Advances in Cryptology—CRYPTO 2018, Volume 10991.

The procedure 300 comprises inserting in the body BD of the data block Bn, which is being generated, one or more transmission records for which a request is received during the hashing time ty of the data block Bn (block 303).

The request for recording the transmission of the data packet dp comprises information on the data packet dp and, optionally, the hash value Hn−1 of the last data block Bn−1 comprised in the copies of the ledger L1-L9 at the time of transmission of the data packet dp. For example, the information on the data packet dp comprises one of, preferably both, the identification codes ID1 and ID9 of the sender node N1 and the recipient node N9, and additionally or alternatively an identification code of the data packet dp and/or of a sequence of data packets to which the data packet dp belongs. Even more preferably, the information contained in the registration request shall be encrypted by means of the identification code ID9 of the recipient node N9 and/or signed by means of the identification code ID1 of the sender node N1. In this way, once the data block Bn has been generated, each transmission record rdp stored in the body BD is associated in an unalterable way with the hash value Hn and the count value Cn of the data block Bn, thus providing a certain time indication of the transmission of the corresponding data packet dp.

Preferably, the request for recording the transmission of the data packet dp also comprises the certified timestamp, mentioned above.

The data block Bn thus generated is added to the copies of the ledger L1-L9 after having been verified—by means of the verification algorithm $v_H$—by the nodes N1-N9 of the network 1 (block 305).

The procedure 300 then comprises repeating the steps described above from block 301 to generate a new data block Bn+1 whose hash value Hn+1 is calculated from the hash value Hn of the data block Bn.

Returning to the procedure 100, the transmitted data packet dp is received by the node indicated in the receiver field ID-R—the node N3 in the case under consideration—(block 113) and it is verified whether this node of the network 1 corresponds to the recipient node N9 (decision block 115).

In the negative case (output branch N of block 115), the procedure 100 comprises repeating the previous steps starting from the determination of a graph database DBG3—illustrated in FIG. 4b—of which the receiver node N3 is the central node so as to determine a new node N1-N9 to which to transmit the packet (block 103, procedure 200), to modify the receiver field ID-R of the data packet dp by inserting the identification code ID1-ID9 associated with the identified node N1-N9 (block 105) and then to transmit the data packet dp to the same (block 107) while requesting (block 109) the registration of the transmission in a new block of the ledger L1-L9 (which is done as described in relation to block 111 and procedure 300) and to verify again whether the data packet dp has been received by the recipient node N9 (blocks 113 and 115).

When the data packet dp is received by the recipient node N9 (output branch Y of block 115)—after the transmission executed by the receiver node N3 in the example considered—, the procedure 100 provides that a time information associated with the packet dp is identified through the copy of the ledger L9 stored by the recipient node N9 (block 117). Preferably, it is envisaged to identify the data block Bn—in particular the corresponding count value Cn—in which the transmission of the data packet dp carried out by the sender node N1 is recorded. Thanks to this information, the recipient node N9 is able to identify the position of the data packet dp within a sequence of data packets transmitted by the node N1 and thus to correctly reconstruct the information communicated by the sender node N1.

Figure 9:
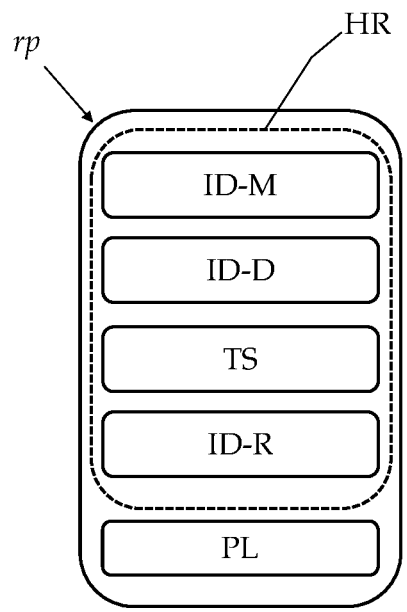
FIG. 9 is a schematic representation of a generic data block of the shared digital ledger of FIG. 7 according to an embodiment of the present invention.

Preferably, the procedure 100 requires the recipient node N9 to generate and transmit a reply packet rp to acknowledge receipt of the data packet dp (block 119). In general, the reply packet rp (illustrated schematically in FIG. 9) comprises a header, or header HR, and a payload, or payload PL. The header HR comprises a sender field ID-M in which there is reported the identification code ID1 of the sender node N9 of the reply packet rp, a recipient field ID-D in which it is reported the identification code ID1 of the recipient node N1 of the reply packet rp, a receiver field ID-R in which it is reported the identification code of a receiver node to which the packet is actually to be transmitted and, optionally, a timestamp TS indicating an instant of time of the generation of the reply packet dp as measured by the node N9. Instead, the payload PL of the data packet dp comprises a reference to the received data packet dp. In particular, the procedure 100 comprises inserting in the receiver field ID-R the identification code of a node N1-N9 of the network 1 selected by means of procedure 200 described above-which may be different from the node N3 used for transmission of the data packet dp. In a manner analogous to that described above, the reply packet rp will be transmitted between one or more nodes until reaching the sender node N1 of the data packet dp in a manner analogous to that described above in relation to blocks 103-107 and not repeated here for brevity's sake.

In the embodiment considered, unlike to what is described for the data packets dp, the reply packet rp is not required to be recorded on the transmission in the copies of the ledger L1-L9.

Once the sender node N1 of the data packet dp receives the corresponding reply packet rp (block 121), the procedure 100 comprises checking whether there are one or more other data packets dp' to be transmitted (decision block 123). In the affirmative case (Y branch of block 123), the procedure 100 comprises repeating the steps described above from what is described in relation to block 103 to transfer a new data packet dp'. Otherwise, if there are no more data packets dp' to transmit (branch N of block 123), the procedure 100 ends (termination block 125.)

However, it is clear that the above examples must not be interpreted in a limiting sense and the invention thus conceived is susceptible of numerous modifications and variations.

For example, in an alternative embodiment, it is envisaged that each node N1-N9 deletes from the body of data blocks B0, . . . , Bn+1 of its copy of the shared digital ledger L1-L9 the transmission records referring to transmissions in which it did not act as sender node or recipient node. For example, each node is configured to delete transmission records that it is unable to decipher by means of its private key or that are not signed by means of its identification code.

Again, nothing prevents from providing for a different procedure (not illustrated) in which the recording of only the first transmission of each data packet from the sender node to another node is required-regardless of whether that node is the recipient node or a receiver node.

Otherwise, nothing prevents from implementing an alternative procedure (not illustrated), in which one or more transmissions of the reply packet transmitted by the recipient node of the data packet to the sender node thereof are recorded.

Although, the use of graph databases and the proof-of-history protocol synergistically make it possible to obtain a packet communication structure with a low latency, such as to allow a fast and reliable communication between two or more nodes of the network, there is nothing to prevent that in alternative embodiments of the present invention, instead of the graph database, a different system is used to identify a sequence of nodes that allow to execute a data transmission, for example a relational database.

Figure 10:
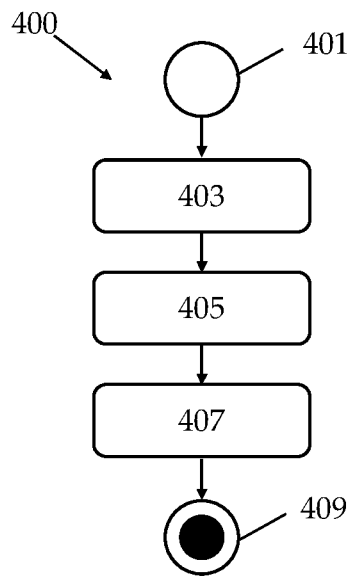
FIG. 10 is a flow chart of a procedure for populating a list of identifiers of the telecommunication network nodes according to an embodiment of the present invention.

In one embodiment illustrated in FIG. 10, the registration entity ER comprises executing a procedure 400 of population of the list Rx of identification codes stored by the generic node Nx at the time of the registration of the latter in the network 1.

The procedure 400 is initiated when the generic node Nx requests insertion into network 1 and, at the same time, generation of its identification code IDx and associated private encryption key (start block 401).

The procedure comprises analysing a list of contacts stored in the node Nx (block 403)—for example, the telephone book and/or a list of known e-mail addresses in the case of a mobile device and/or a list of other similar contact codes—and checking whether one of the contacts recorded in this list is associated with a node of the network 1 (block 405). For example, the registration entity ER is configured to check whether one or more of the contacts comprised in the contact list of the node Nx is associated with a corresponding identification code ID1-ID9 of the network. For this purpose, the registration entity ER maintains and updates a list of nodes of the network 1; preferably, each entry in the list comprises an identification code ID1-ID9 and at least one other identifier element of the network node Nx—for example, an e-mail address, a telephone number/IMSI code, a telephone IMEI code or a modem MAC code, or other similar identifier elements associated with the node N1-N9 of the network 1. The registration entity ER is configured to check for the presence of one of these identifier elements in the contact list of the node Nx.

For each match found, it is provided for the identification code ID1-ID9 associated with a node N1-N9 that can be traced back to a contact in the contact list of the node Nx to be communicated to the node Nx (block 407) and then the procedure ends (at termination block 409).

The procedure 400 allows communication channels to be set up easily in the network 1 and enables effective communication to a generic node Nx as soon as the latter becomes part of the network 1.

As will be evident to the person skilled in the art, optional steps may be envisaged to enable on-demand access to the contact list comprised in the various nodes of the network and/or to enable the distribution of the identification codes so as to guarantee the control to the node owner of the data analysed or provided by the registration entity ER.

Figure 11:
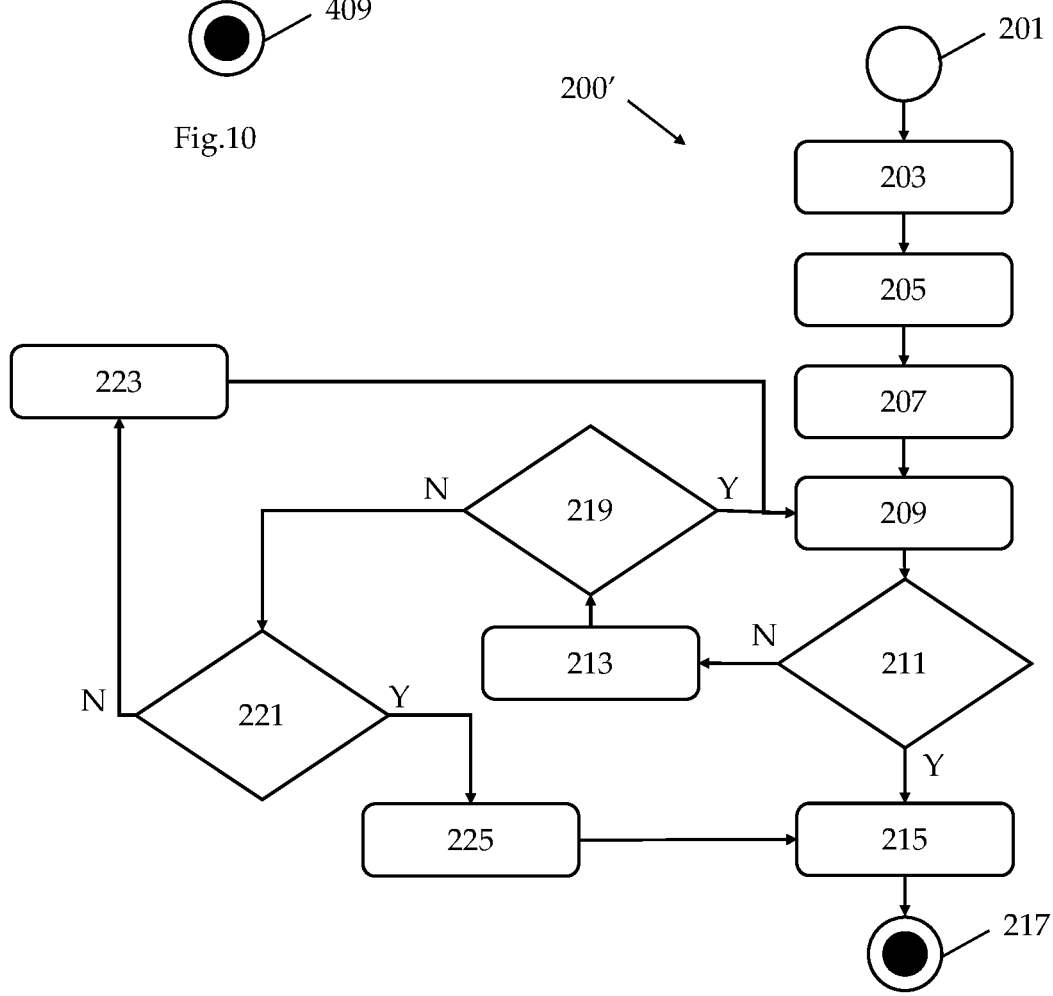
FIG. 11 is a flow chart of a procedure for determining a receiver node to which to transmit a data packet according to an alternative embodiment of the present invention.
Figure 12:
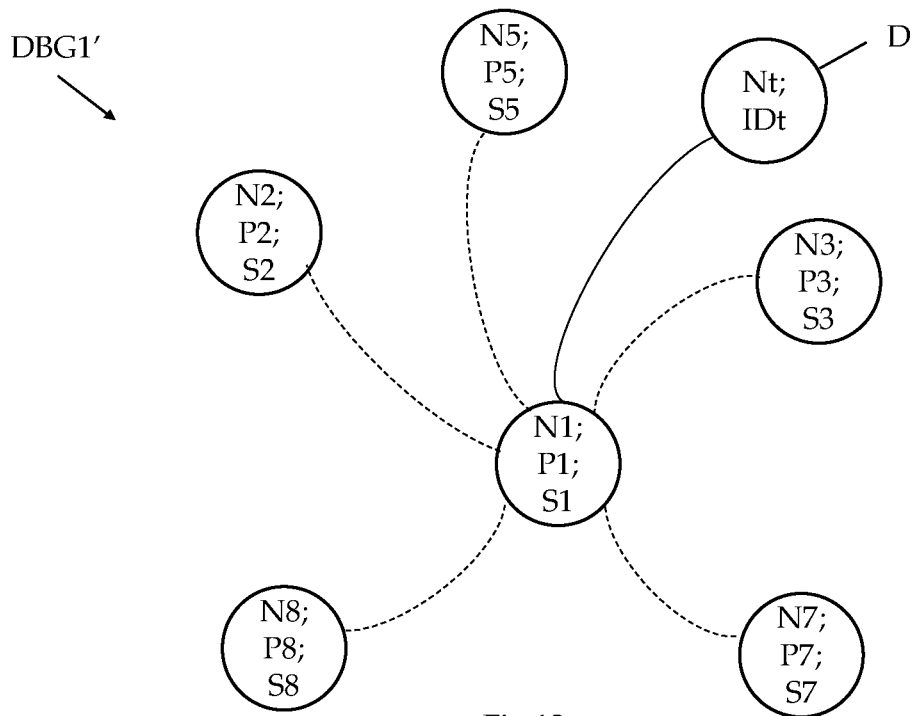
FIG. 12 is a schematic representation of a graph database in which a temporary node is added to the telecommunications network according to the procedure in FIG. 11.
Figure 13:
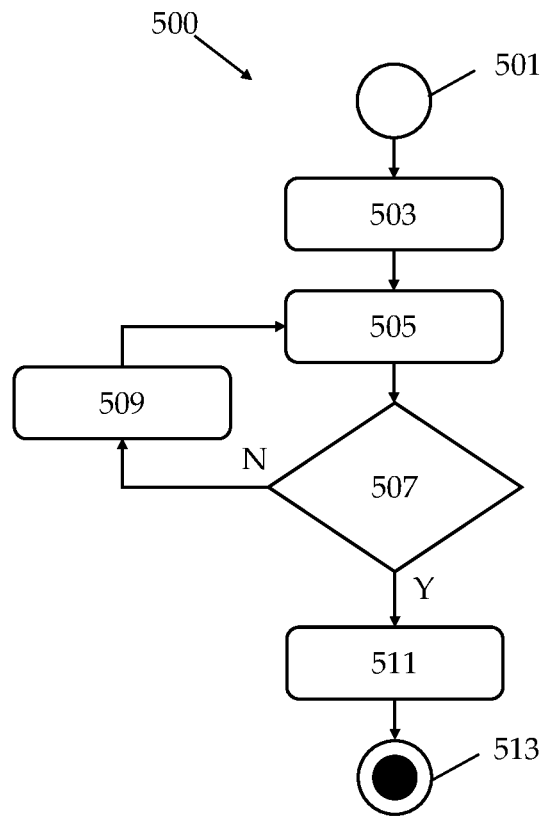
FIG. 13 is a flowchart of a procedure configured for identifying a minimum sequence of nodes in the telecommunications network required to transmit a data packet from a sender node to a recipient node according to an alternative embodiment of the present invention.
Figure 14:
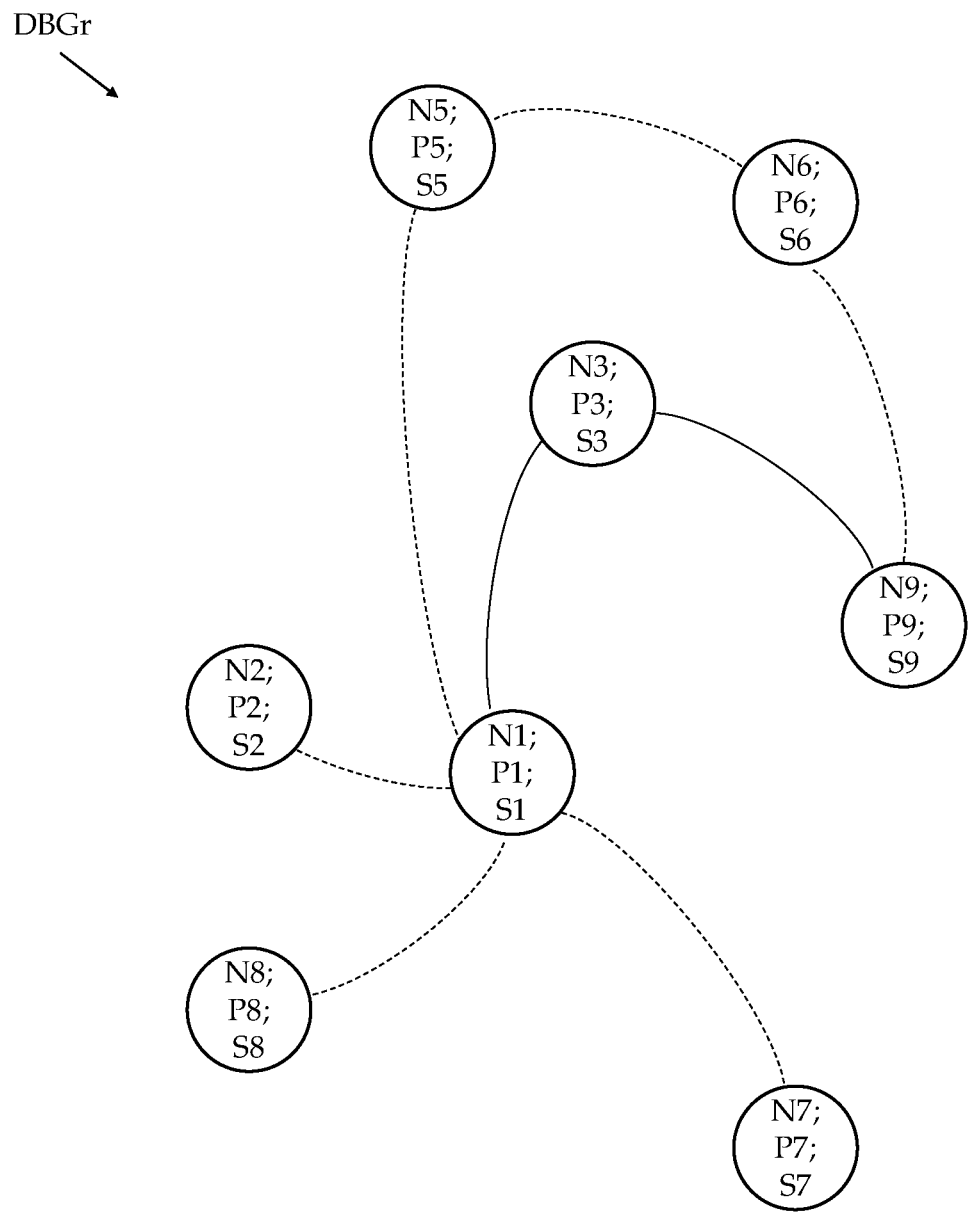
FIG. 14 is a schematic representation of a graph database of the telecommunications network according to an alternative embodiment of the present invention, used by the procedure in FIG. 13.

In a variant of the procedure 100, it is envisaged enabling temporary network nodes through an alternative node selection procedure 200', which is referred to in the flowchart in FIG. 11 and the graph database in FIG. 12. In detail, a generic temporary node is a device D with characteristics similar to those of the nodes described above and equipped with the software application AS, but which has not been assigned a corresponding identification code. In other words, the device D is configured to operate as a generic network node Nx of the network 1, but is not yet enabled to exchange data with the other nodes N1-N9 of the network 1. In the variant of the procedure 100, in the event that a node N2-N8 of the network 1 is not found within the useful distance from a sender node N1, it is envisaged to check whether one of the contacts comprised in the contact list of the sender node is able to operate as a temporary node and whether it is within the useful distance. In the affirmative case, the variant of the procedure 100 requires a temporary identification code IDt to be assigned to the temporary node Nt in order to enable it to transceive data packets. Once the data packet has been transceived, the temporary node Nt is removed from the network—and the temporary identification code IDt is removed from the list of the registration entity.

In detail, the procedure of alternative node selection 200' comprises checking (decision block 219) whether there is an alternative node N2-N8 in the list R1 of the sender node N1, each time a node at a shorter distance is discarded (at block 213 as described above).

In the affirmative case (output branch Y of block 219), a new minimum path is selected by repeating the above steps from block 209.

Conversely, when no alternative nodes N2-N8 are available in the list R1 of the sender node N1 (output branch N of block 219), the contact list stored by the sender node N1 is analysed to identify the presence of a contact associated with a device D capable of operating as a temporary node Nt of the network 1 (decision block 221). For example, the registration entity ER is configured to check if one or more of the contact codes comprised in the contact list of the sender node N1 are associated with a device D on which the software application AS has been installed.

In the negative case (output branch N of block 221), the data packet dp cannot be transmitted and the transmission is aborted or, preferably, delayed for a predetermined time interval (block 223), before repeating the procedure 200' starting from the selection of a new minimum path (block 209).

On the other hand, if a device D capable of operating as a temporary node Nt (output branch Y of block 221) is identified, a temporary identification code IDt is assigned to the device D—for example, by the registration entity ER-enabling it to transceive data packets dp as a temporary node Nt (block 225).

Finally, the temporary identification code IDt associated with the temporary node Nt is provided at the output (block 215 described above) for the continuation of procedure 100.

Preferably, temporary node Nt is disabled once the transmission of the data packet dp by the sender node N1 is completed and/or upon completion of a transmission of a plurality of data packets dp by the sender node N1.

Advantageously, when the temporary node Nt is enabled to transceive data packets dp, the procedure 400 of population of the list Rt of identification codes stored by the temporary node Nt is executed.

In addition, it will be evident that several temporary nodes may be enabled simultaneously within the telecommunications network to ensure that the data packet can be successfully transmitted.

Thanks to this solution it is possible to guarantee greater network coverage, particularly during an initial network activation phase or to ensure a network operation even during high traffic.

Of course, there is nothing to prevent the identification code ID1-ID9 and the private key from being used as a cryptocurrency wallet in addition to the functions described above. In this way, the network 1 can handle economic transactions in parallel with the transmission of data packets, without the need to implement major changes.

In alternative embodiments (not illustrated), the encryption of information in the data packets and/or of information of the shared digital ledger blocks, as well as the digital signature thereof, may be executed using encryption codes that differ from each other and, in general, differ in the identification code of the network node for which they are intended or which generates such information.

In general, each data block in the shared digital ledger records the transmission of only one data packet belonging to the same sequence of data packets generated and transmitted by a sender node to the same recipient node. However, nothing prevents the same block, in alternative embodiments (not illustrated), from recording two or more transmissions of the same number of data packets from the same sender node to the same recipient node. In such a case, the recipient node will order these data packets-whose registration is comprised in the same data block-according to the value of the timestamp contained in the header of these packets.

In addition or alternatively, each recorded transmission of a data packet may be associated with the last hash value calculated by an iteration of the hashing algorithm at the time the transmission was recorded.

Consequently, the recipient node of a plurality of data packets is configured to order the received data packets according to the position in the shared ledger of the data block in which the transmission of each data packet by the sender block is recorded.

In addition, in case a data block comprises several data packets transmitted from the same sender node to the same recipient node, these packets are ordered by the timestamp and/or hash value associated with the corresponding transmission record comprised in the relevant block of the digital ledger.

As will be evident to the person skilled in the art, several nodes of the network can transmit data packets in parallel and, similarly, several nodes of the network can receive data packets in parallel. In other words, several instances of the procedures 100 and 200 may be executed in parallel within the network each to handle the transmission of one or more data packets between corresponding sender nodes and recipient nodes. Moreover, there is nothing to prevent variants of the procedure 100 in which the nodes of the network operate in such a way as to transmit data packets in multicast or broadcast mode.

In a different embodiment (not illustrated), there is a modified node selection procedure. According to this modified procedure, if the identification code of the recipient node is comprised in the list of the sender node, it is envisaged to transmit the data packet directly to the recipient node even if the latter is not the nearest node to the sender node. In detail, the modified procedure comprises checking that the recipient node is within a useful distance from the sender node—for example, within a maximum range at which the sender node can transmit the data packet—and transmitting the packet to the data recipient node in the affirmative case. If, on the other hand, the recipient node is not within the distance of the sender node, the modified procedure executes the same steps as described above in relation to procedure 200.

In addition or as an alternative, an alternative embodiment comprises implementing an alternative node selection procedure 500 (illustrated by the flowchart in FIG. 11) which comprises identifying the minimum node path that allows to connect the sender node to the recipient node. In this case, the procedure 500, once started (start block 501) comprises generating a network graph database DBGr—illustrated schematically in FIG. 12—in which each node of the graph database DBGr corresponds to a node N1-N9 of the network 1 and each arc connects two nodes together when their respective identification codes ID1-ID9 are stored in the corresponding lists R1-R9 (block 503). In the example in FIG. 11, for the sake of simplicity, only the arcs connecting the sender node N1 to the nodes N2, N3, N5, N7 and N8 whose identification codes ID2, ID3, ID5, ID7 and ID8 are contained stored in the list R1 of the sender node N1 and the arcs associated with the nodes N3, N5 and N6 which enable establishing a path between the sender node N1 and the recipient node N9 are illustrated.

In other words, when a sender node, node N1 in the example in FIG. 12, needs to transmit one or more data packets dp to a recipient node, node N9 in the example in FIG. 12, it first checks whether the node N9 is directly reachable and, in the affirmative case, it initiates a direct transmission of the data packets dp. In the negative case, the node N1 sends a request message comprising the identification code ID9 of the recipient node N9 to one or more of the known nodes N1-N8. Preferably, the node N1 initially sends the request message to node N1-N8 at minimum distance, node N3 in the example in FIG. 12—selected as described above. The receiver node N3 of the request message checks if the identification code ID9 of the recipient node N9 is comprised in its list R3 of identification codes. In the affirmative case, the receiver node N3 sends an acknowledgement message to the sender node N1 which comprises an indication that the recipient node is reachable. Preferably, the acknowledgement message comprises a list of the identifiers ID2-ID8—in the case considered the identification code ID3 only—that each data packet dp will have to cross to reach the recipient node N9 and/or possibly an estimated transmission time. On the contrary, when the list of the receiver node does not comprise the identification code ID9 of the recipient node N9, as in the case of the list R5 of the node N5 in FIG. 12, the receiver node selects a node comprised in its list, preferably the node with the shortest distance, such as node N6 in the example in FIG. 12, to which it transmits a copy of the request message. Consequently, the transmission of the request message is repeated until a sequence of nodes N2-N8 is defined, which allows the sender node N1 to transmit the data packets dp to the recipient node N9.

The steps described above are repeated at least one more time, by selecting a new receiver node from among the nodes N2-N8, whose identifier ID2-ID8 is contained in the list R1 of the sender node N1, and different from the receiver node N3 selected during the previous iteration. Preferably, the sender node is configured to send a copy of the request message to each of the nodes N2-N8 whose identifier ID2-ID8 is contained in the list R1. Even more preferably, copies of the request message and the steps described above are performed in parallel.

Next, the alternative procedure 500 comprises determining the shortest path in the graph database DBG to connect the sender node N1 to the recipient node N9 (block 505). In other words, the path crossing the smallest number of arcs and nodes in the graph database DBG connecting the sender node N1 to the recipient node N9 is selected. In general, the minimum path is identified by iteratively verifying, starting from the sender node N1, if there is an arc of the graph database DBGr that connects the considered node N1-N8 with the recipient node N9 and, in the negative case, it will examine the connected nodes N2-N8 by means of arcs connected to the nodes N2-N8 in turn connected to the node considered previously until identifying an arc that connects a node N2-N8 of the network 1 with the recipient node N9. Among the one or more possible paths identified, the path comprising the smallest number of nodes and arcs connecting the sender node N1 to the recipient node N9 is selected as the minimum path—the path N1-N3-N9 in the example considered, indicated by arcs made with continuous lines in FIG. 12.

Once the minimum path has been determined, the alternative procedure 500 comprises verifying that it is actually possible to establish a communication channel through the nodes N1-N9 of the network 1 comprised in the minimum path (decision block 507). In detail, the alternative procedure 500 comprises verifying that the nodes N1-N9 of the network 1 comprised in the minimum path are comprised in a useful communication region. For example, it is verified that each node N1-N9 of the network 1 comprised in the minimum path is within the useful distance of the previous node N1-N9 of the network 1 of the minimum path—based on the acquired P1-P9 position indications. Optionally, the procedure 400 also comprises checking that each node N1-N9 of the network 1 comprised in the minimum path is available to establish a communication channel—based on the S1-S9 capacity indications acquired.

In the negative case (output branch N of block 507), the minimum path determined is discarded (block 509) and the alternative procedure 500 comprises selecting a new minimum path by repeating the steps described above from block 505.

Otherwise, the minimum path is considered usable (output branch Y of block 507) and the alternative procedure 500 comprises outputting the identification code ID2-ID9 of the first receiver node—the node N3 in the example considered-subsequent to the sender node N1 in the minimum node sequence thus determined (block 511) for the continuation of the procedure 100 and then terminating (at the end block 513).

In addition or alternatively, the procedure 200 or the alternative procedure 500 instead of generating each time the graph database DBG1-9 of each node or the overall graph database DBGr comprise—during iterations following a first iteration—updating such graph databases DBG1-9 or DBGr, in order to add or remove nodes and modifying the position or capacity indications according to the current state of the nodes of the network 1.

Of course, one or more of the steps of the procedures 100, 200, 300, 400 and 500 described above may be executed in parallel with each other—such as the steps relating to blocks 107 and 109; 203, 205 and/or 209, and 301 and 303—or in a different order from that presented above. In particular, it will be apparent that the procedure 300 is implemented substantially in parallel with the steps of the procedure 100 and the procedure 200/500 during the operation of the telecommunications network.

Alternatively, the sender node can be configured to transmit a connection request to the recipient node, which contains the identification code ID9, to the nodes of the graph database to which it is connected. This request is propagated in the graph until it reaches the node N9 which issues a reply message. When the sender node receives a first reply message, it transmits the data packet to the neighbouring node that sent the reply message to it.

Similarly, one or more optional steps can be added or removed from one or more of the procedures described above. For example, the procedure 100 may comprise additional steps in which a timeout time is monitored from a transmission instant of a corresponding data packet, in the event that a corresponding reply packet is not received within this timeout time, the transmission of the packet is considered to have failed and the data packet must be retransmitted.

Furthermore, there is nothing to prevent an attempt to transmit a data packet from being aborted and an error signal generated if it is not possible to locate a node available to receive and possibly to forward the data packet or a sequence of nodes of the network available to operate as receiver nodes, or if there are no nodes of the network within the useful communication region of one or more nodes in the sequence.

Moreover, there is nothing to prevent the network nodes from being configured to modify the transmission technology of the same data packet between two different network nodes in order to guarantee the transmission of the data packet from the sender node to the recipient node. For instance, a generic data packet may initially be transmitted according to the LTE standard between a first pair of nodes, then according to the WiFi Direct or Bluetooth standard between one or more second pairs of intermediate receiver nodes, and finally according to the UMTS standard between a receiver node and the recipient node. In particular, in the case of a wireless telecommunications network, such transmissions generally comprise both device-to-device (mobile) transmissions, (referred to as D2D), and transmissions from a mobile device to a radio base station, router, or the like.

Furthermore, as will be apparent to the person skilled in the art, the procedures 100, 200, 300, 300 and 500 in accordance with various embodiments of the present invention are suitably combinable so as to constitute substantially a method which guarantees the reception-transmission of data packets among nodes of the network in a secure manner with a P2P type structure, in particular substantially invulnerable to man-in-the-middle attacks and capable of maintaining the confidentiality of the information exchanged.

In particular, the method according to the present invention is capable of effectively supporting one or more of instant messaging, voice and video communications services.

Naturally, all the details can be replaced with other technically-equivalent elements.

In conclusion, the materials used, as well as the contingent shapes and dimensions of the aforementioned devices, apparatuses and terminals, may be any according to the specific implementation requirements without thereby abandoning the scope of protection of the following claims.

The invention claimed is:

1. A method of communication between nodes of a telecommunication network, each node keeping a copy of a distributed ledger, being identified by a respective identification code and implements a software application configured to manage the transmission of data packets and maintaining the distributed ledger, the method comprising that each sending node of a data packet executes the steps of:
a. memorizing a list of identification codes, each identification code identifying a respective node comprised in a subset of nodes of the network,
b. identifying a receiver node to which to transmit said data packet,
c. generating a data packet to be delivered to a recipient node,
d. transmitting the data packet to the receiver node,
e. issuing a request to the network nodes to record said data packet transmission in the distributed ledger, and
when a data packet is received, the method requires that each receiver node, other than the recipient node of the data packet, repeat at least the steps b., and d.,
wherein the step a. of identifying a receiver node to which said data packet is transmitted comprises:
generating a graph database in which a respective arc connects the sender node or the receiver node, different from the recipient node, to each node of the network of which the identification code is comprised in the list of identification codes of the sender node or the receiver node, other than the recipient node, and
selecting the receiver node among the nodes of said graph database,
wherein when it is not possible to identify a receiver node, the method further comprises the steps of:
analyzing a contact list stored in the sending node, each contact in the contact list being associated with a corresponding device;
when at least one contact is identified in which is associated with a device having installed said software application but not enabled to exchange packets in the telecommunication network, enabling said device to exchange packets as a temporary node of the telecommunication network, and selecting said device as receiver node of the data packet.

2. The method according to claim 1, wherein the step of enabling said device to exchange packets as a temporary node of the telecommunication network comprises:
assigning a temporary identification code to said device.

3. The method according to claim 1, further comprising the step of disabling the device from operating as a temporary node of the telecommunication network once completed the transmission of at least one data packet.

4. The method according to claim 1, wherein the step a. of identifying a receiver node to which transmit said data packet further comprises:
acquiring a position information of the network nodes comprised in the graph database;
wherein selecting the receiver node among the nodes of said graph database comprises selecting the node of the graph database at a minimum distance from the sending node or from the receiver node, different from the recipient node.

5. The method according to claim 4, wherein acquiring a position information of the network nodes comprised in a graph database comprises, for each node of the network comprised in the graph database, to acquire at least one among:
a geographical position measured through a global navigation satellite system (GNSS) with which the node is equipped,
information relating to a cellular network cell to which the node is connected,
an IP address associated with the node,
an access point name to which the network node is connected, and
geolocation data associated with the node by a geomessaging service or a geomarketing service.

6. The method according to claim 1, wherein selecting the receiver node among the nodes of said graph database comprises:
identifying at least one sequence of nodes and arcs of the graph database that allows to connect the sending node or the receiving node, different from the recipient node, to the recipient node, and
selecting as the receiver node the first node of said at least one sequence next to the sender node or in the node receiver, different from the recipient node.

7. The method according to claim 6, wherein identifying at least one sequence of nodes and arcs of the graph database provides for identifying a sequence that defines a minimum path between the sender and the recipient node.

8. The method according to claim 1, further comprising the steps of:
acquiring an information of availability to receive and retransmit the data packet from the selected receiver node;
when the selected receiver node is not available to receive and retransmit the data packet, discarding the selected receiver node, and
selecting a new receiver node having a distance from the sending node or from the receiver node, different from the recipient node, lower than the distance of the other nodes of the graph database from the sending node or from the receiver node, different from the recipient node.

9. The method according to claim 4, further comprising the steps of:
checking whether the recipient node is comprised in the graph database;
in the affirmative case, checking whether the recipient node is within a useful communication distance from the sending node or from the receiver node, other than the recipient node, and
in the affirmative case, selecting the recipient node as the receiver node even if there is a different node of the graph database at a minimum distance from the sending node or from the receiver node, other than the recipient node.

10. The method according to claim 1, further comprising the steps of:
analyzing a contacts list stored in each node, said contact list comprising, for each contact, at least one identifier element between:
a telephone number;
an IMSI code;
an IMEI code, and
a MAC code;
identifying an identifier element associated with an identification code of a network node, and
supplying said identification code to the node comprising the corresponding identification element.

11. A telecommunication network comprising a plurality of nodes, each node comprising at least one data processing module, a memory module and a transceiver module, where each node is configured for:
maintaining a copy of a distributed ledger, and
executing the method according to claim 1.

* * * * *